Apr. 10, 1923.

J. M. MAXWELL 1,450,985

PROCESS OF REGENERATING BEDS OF EXCHANGE SILICATES

Filed June 27, 1922

Inventor
J. M. Maxwell,
By Bright & Bailey
Attorneys

Patented Apr. 10, 1923.

1,450,985

UNITED STATES PATENT OFFICE.

JOSEPH M. MAXWELL, OF WICHITA, KANSAS.

PROCESS OF REGENERATING BEDS OF EXCHANGE SILICATES.

Application filed June 27, 1922. Serial No. 571,329.

*To all whom it may concern:*

Be it known that I, JOSEPH M. MAXWELL, a citizen of the United States, and resident of Wichita, in the county of Sedgwick and State of Kansas, have invented certain new and useful Improvements in Processes of Regenerating Beds of Exchange Silicates, of which the following is a specification.

My invention relates to an improved process of regenerating after use a bed of water softening exchange silicates contained in a water softening apparatus of the well known "permutit" type.

The purpose of my invention is to produce a regenerative process of the type specified which will be effective in its result, which will materially prolong the active period of the bed after regeneration, and which will materially decrease the time necessary to effect regeneration with corresponding decrease in the periods of idleness of the apparatus.

In the accompanying drawing I have shown somewhat typically, and more or less diagrammatically, certain embodiments of a water softening apparatus susceptible of use in carrying my invention into practice. In this drawing—

Figure 2:
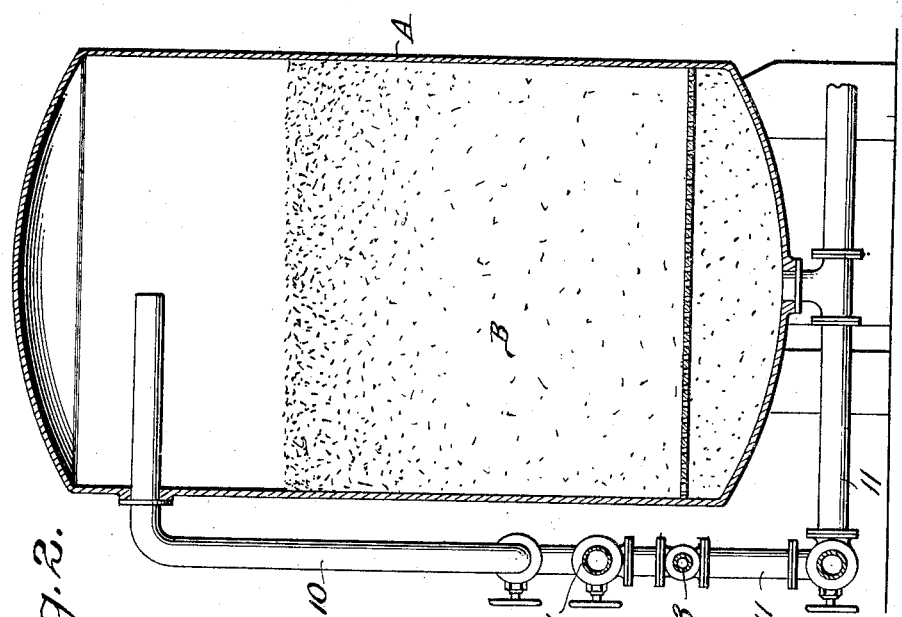
Figure 1:
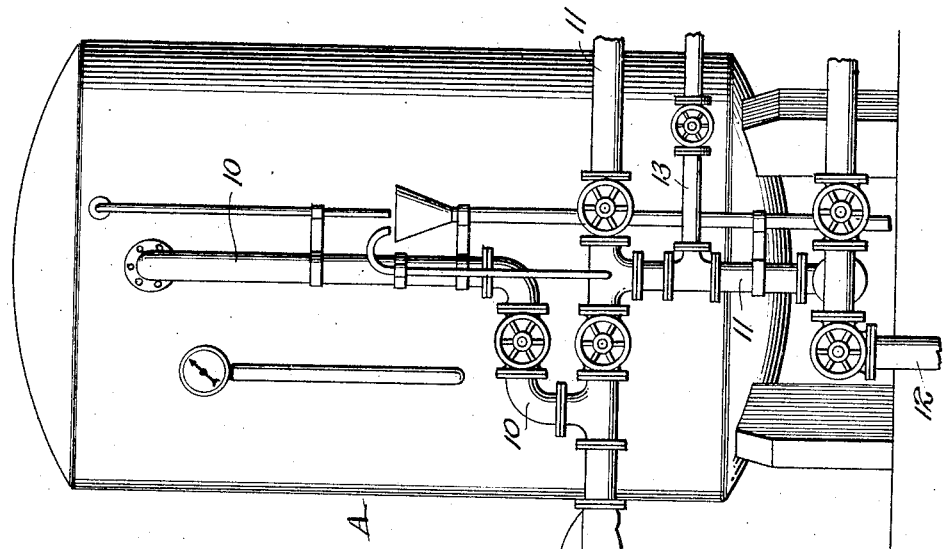

Figure 1 is a view in elevation of a water softening apparatus capable of use in connection with my process; and Fig. 2, a vertical section of the same.

Referring to the drawing the apparatus is shown as comprising a casing A containing a bed of exchange silicates B. Hard water to be softened is supplied under pressure from a suitable main (not shown) and is led through a pipe 10 from which it is discharged into the casing A near the top thereof. The hard water delivered to the casing A then passes downwardly through the bed B and is softened during its passage therethrough in the usual and well known manner. The softened water is then discharged from the lower end of the casing and is led through a suitable piping 11 to a soft water storage tank (not shown). It will be understood that the pipe connections previously referred to are suitably valved for their proper control and that the pipe connection 11 is tapped by a branch valved drain pipe 12 whereby the contents of the case A can be drained when desired.

For the purpose of carrying out my process of regeneration the pipe 11 is connected with a valved pipe 13 leading to a suitable salt solution tank (not shown) and from which the material essential to regeneration of the bed B is adapted to be pumped into the casing A.

In effecting the desired regeneration of the bed B I first drain down the hard water in the casing to substantially the level of the horizontal portion 10' of the pipe 10. I then backwash with hard water with pressure at approximately 40 pounds and at the rate of approximately 40 gallons per minute until substantially 240 gallons of hard water have been backwashed through the bed B. This water is then drained off and 350 gallons of salt solution is then pumped through pipe 11 from the salt solution tank into casing A to submerge the bed B. I have found in my experiments that proper and effective regenerative results require that such salt solution be formed in the proportion of substantially 700 gallons of water to 400 pounds of salt. As continued steps in my process I allow the bed B to remain submerged in the bath of salt solution for not less than seven hours and then drain off said solution to the top of the bed B. I then pump 350 gallons of corresponding salt solution into casing A and submerge bed B in such solution a second time. This second quantity of contaminated salt solution is then drained off to the level of the top of the bed B, after which the hard water supply is turned on to completely wash out all traces of salt solution when the regeneration of the bed B is complete and the apparatus ready for a period of prolonged normal use. It will of course be understood that after regeneration of the bed B, the well known air line of such apparatus and the gauge glass should be blown out and drained respectively of salt solution before the normal operation of the apparatus is instituted.

I claim:—

1. The process of regenerating after use a bed of water softening exchange silicates contained in a water softening apparatus, which comprises passing fresh water through said bed in an upward direction under pressure sufficient to cause a disturbance of the granular material, then draining the bed, then flooding the bed with a salt solution and subsequently draining off said solution to substantially the top of the bed, again flooding said bed with a corresponding salt solution and subsequently draining said solution off to substantially the top of the bed, and finally washing out the remaining contaminated salt solution with a supply of fresh water.

2. The process of regenerating after use a bed of water softening exchange silicates contained in a water softening apparatus, which comprises passing fresh water through said bed in an upward direction under substantially 40 pounds pressure to cause a disturbance of the granular material, then draining the bed, then flooding the bed with a salt solution, then draining off the said salt solution to substantially the top of the bed; and finally washing out the remaining contaminated salt solution with a supply of fresh water.

3. The process of regenerating after use a bed of water softening exchange silicates contained in a water softening apparatus, which comprises passing fresh water through said bed in an upward direction under pressure sufficient to cause a disturbance of the granular material, then draining the bed, then submerging the bed in a salt solution formed in the proportion of 350 gallons of water to 200 pounds of salt, then draining off said salt solution to substantially the top of the bed, and finally washing out the remaining contaminated salt solution with a supply of fresh water.

4. The process of regenerating after use a bed of water softening exchange silicates contained in a water softening apparatus, which comprises passing fresh water through said bed in an upward direction under pressure sufficient to cause a disturbance of the granular material, then draining the bed, then submerging the bed in 350 gallons of salt solution formed in the proportion of 350 gallons of water to 200 pounds of salt over a period of not less than seven hours, then draining off salt solution to substantially the top of the bed, again submerging said bed in 350 gallons of corresponding salt solution and subsequently draining said solution off to substantially the top of the bed; and finally washing out the remaining contaminated salt solution with a supply of fresh water.

In testimony whereof I hereunto affix my signature.

JOSEPH M. MAXWELL.